Figure 1:
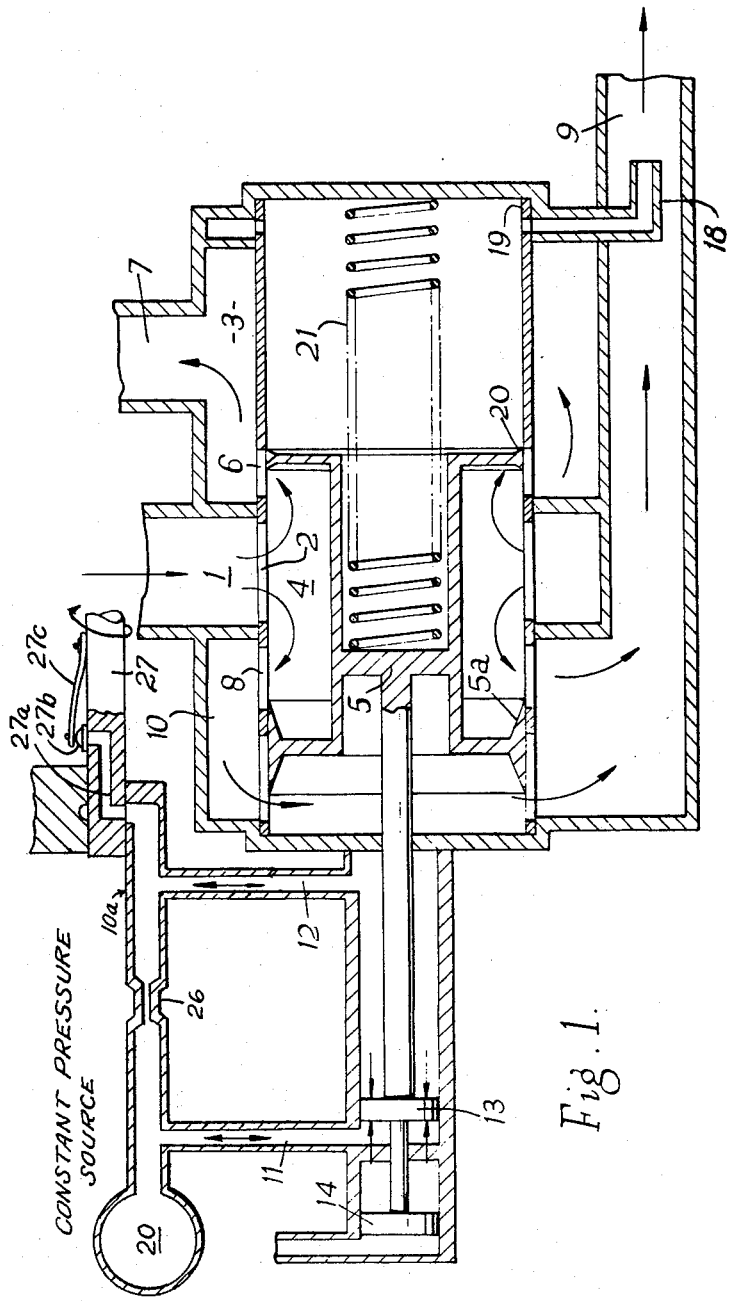
Figure 2:
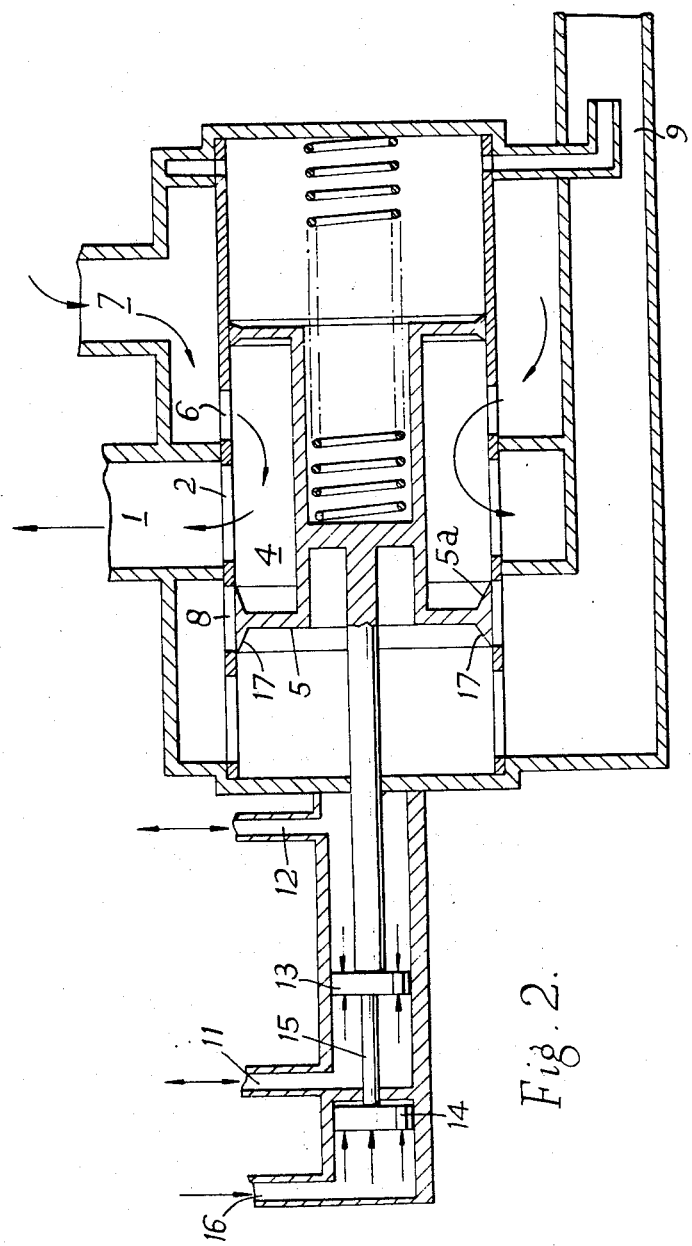

May 19, 1964  G. J. DEVERELL ETAL  3,133,415
COMPOSITE MECHANICAL DRIVES
Filed Oct. 16, 1961  6 Sheets-Sheet 5

United States Patent Office 3,133,415
Patented May 19, 1964

3,133,415
COMPOSITE MECHANICAL DRIVES
Geoffrey John Deverell, Chigwell, and Peter Bruno Kahn, Loughton, England, assignors to The Plessey Company Limited, Ilford, England, a company of Great Britain
Filed Oct. 16, 1961, Ser. No. 145,515
Claims priority, application Great Britain Oct. 25, 1960
8 Claims. (Cl. 60—39.14)

In our co-pending U.S.A. application No. 38,671, we have described and claimed a combined constant-speed drive and starter unit in which an element, for example an alternator, driven by an internal-combustion engine which may be a turbine, is maintained normally at a constant speed by being coupled to the engine through a differential gear drive also coupled to an air motor which latter at low engine speeds is driven by air power to supplement the engine-derived speed of the alternator or the like, while at high engine speeds the air motor is allowed to be driven in the opposite direction by reaction forces from the drive so as to reduce the engine-derived speed of the alternator or the like, means being also provided for power-driving the air motor in the said opposite direction in order to start the engine when the alternator is prevented from reverse rotation, preferably by means of a sprag clutch, and for so-called ground running of the alternator and engine auxiliaries after arranging for the differential gear to be locked so as to run as a solid unit. A constant-speed and starter unit according to our said co-pending application employs in conjunction with the air motor and differential gear drive a control valve, through which under normal running conditions air, for example bleed air from the engine compressor, is admitted to one of the air-motor connections when the engine speed is low, and through which at high engine speeds air is allowed to escape from the same air-motor connections, and which by its position regulates the speed of the air motor according to alternator speed, and a second valve, described as a change-over valve, is arranged in the other air-motor connection and operated so that under normal running conditions this other air-motor connection is connected to the atmosphere, while during starting and ground-running operations the change-over valve admits air from a pressure supply to the said other air-motor connection. In the specific embodiment described in the said co-pending application both the control valve and the change-over valve are of the piston or spool type.

The present invention has for an object to provide an improved piston-type control valve for use in an arrangement according to the said co-pending application, which is adapted to effect a speed control not only under normal running conditions of the engine but also during ground-running operation.

With this object in view, the present invention provides a piston-type control valve which is so constructed that when moved in one direction from a neutral position it connects the air motor to a vent and when moved in the other direction it first connects it to a bleed-air duct, but on further movement again connects it to the vent and isolates it from the bleed-air duct, so that there are two neutral positions about either of which a speed control device, preferably a piston under speed-responsive pressure will stabilise the valve. A unidirectionally acting second hydraulic piston is preferably provided to move the valve beyond the second neutral position to the maximum bleed-air admission position when after a starting operation the engine reaches idling speed.

The term piston-type or spool-type control valve is used in this specification to describe a control valve of which the movable element is a slide of circular cross-section, so that its lands, or at least some of its lands, form moving partitions extending across the cylindrical bore containing the slide and isolate two axially adjacent parts thereof from each other.

Subsidiary features of the invention thus relate to the combination of the control valve with hydraulic or pneumatic actuating pistons.

Figure 3:
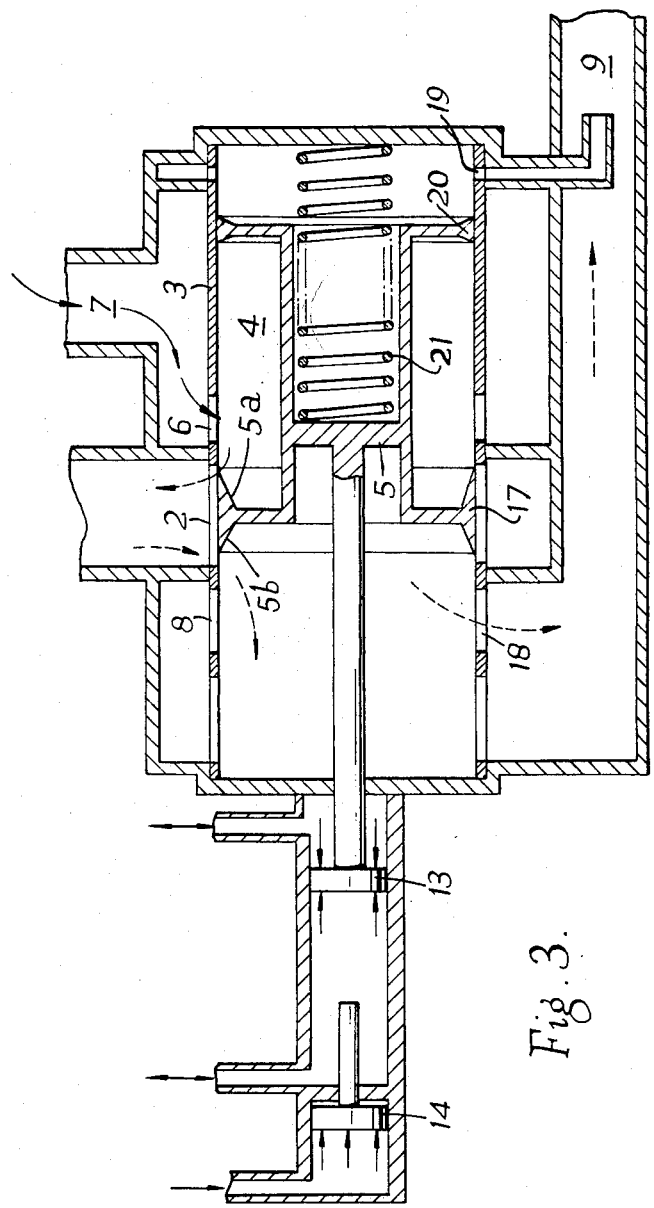
Figure 4:
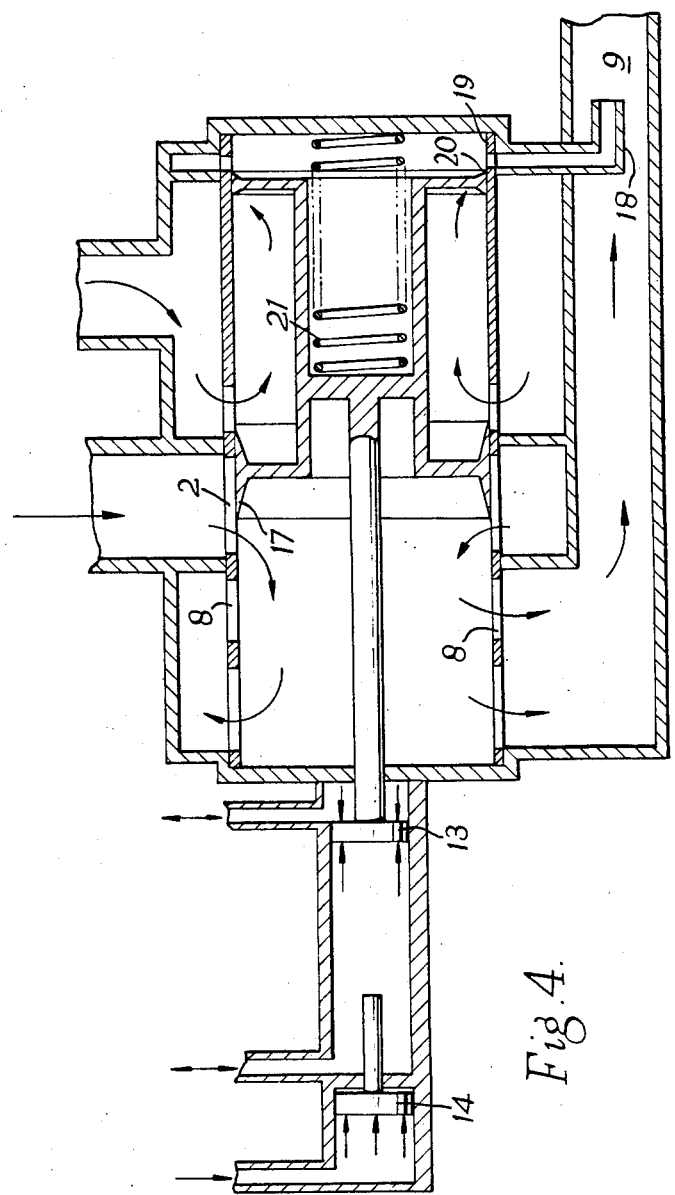
Figure 5:
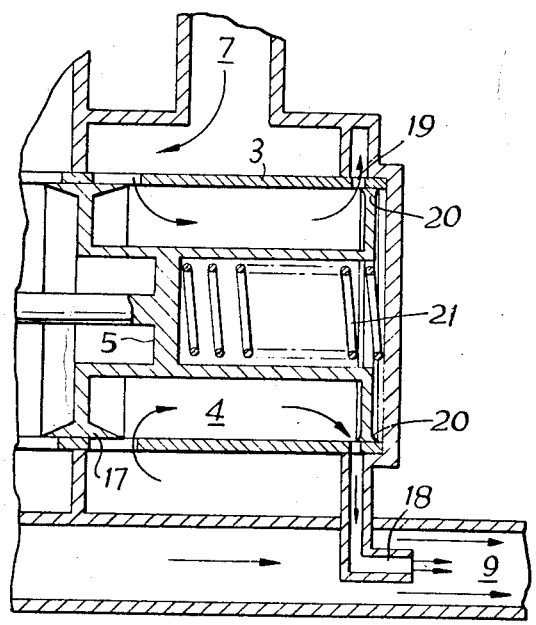
Figure 6:
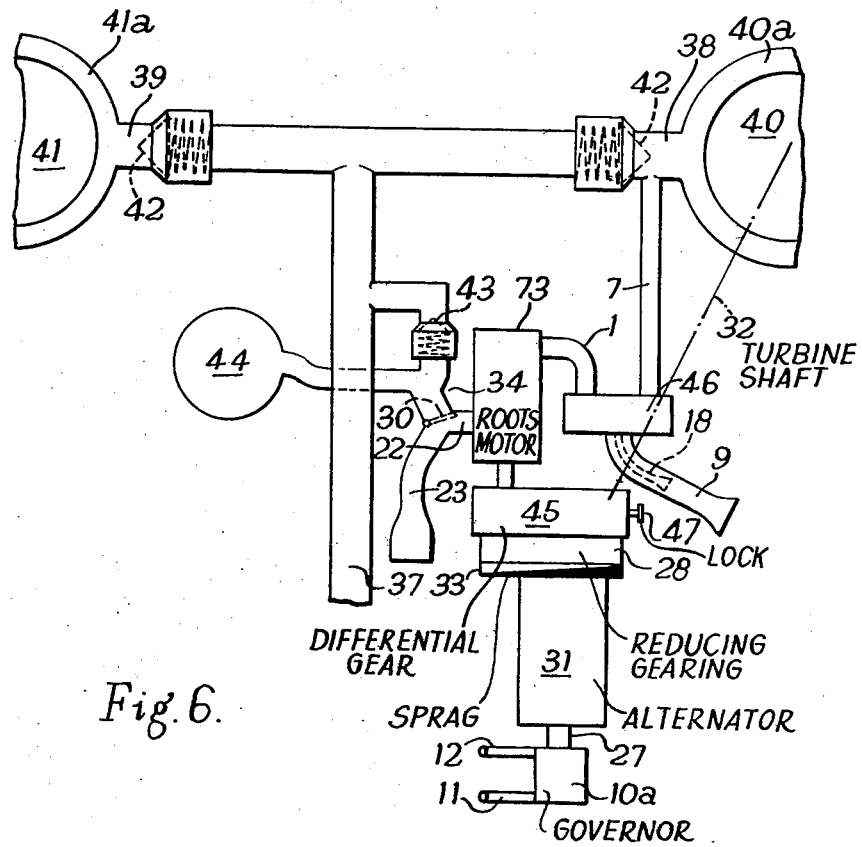

An embodiment of the invention is illustrated in the drawing accompanying the specification, in which FIGURES 1 to 4 are somewhat diagrammatic axial sections of the valve and piston arrangement under four different running conditions, FIGURE 5 is a fragmentary axial section illustrating the modification of flow conditions when engine speed rises above that in which the position shown in FIGURE 4 is applicable, and FIGURE 6 is a diagrammatic view showing the arrangement of the valve according to the invention in a combined constant-speed drive and starting unit associated with one of two gas turbines each equipped with a turbo-compressor for its combustion air and with a bleed line from the said compressor.

Referring now first to FIGURE 6, two gas turbines 40 and 41 are each equipped with a turbine-driven turbo-compressor 40a and 41a respectively. Each turbo-compressor has a bleed 38 or 39 which, via a non-return valve 42, is connected to a common duct 37. The two turbines may be two propulsion turbines of a jet aircraft, and an alternator 31 for supplying the aircraft with A.C. electric energy is to be driven by power mainly derived from the turbine 40 via a shaft 32. In order to maintain the alternator speed constant irrespective of variations of the turbine speed within a predetermined cruising range, a differential gear box 45 has two of its outlets or legs connected respectively to the shaft 32 and, via reducing gearing 28, to the generator 31 while a displacement-type air motor, for example a Roots motor 73, is connected to the third leg of the differential 45, thus permitting the generator speed to be kept constant by causing the air motor 73 to rotate in one direction or the other at such a speed as to supply the necessary supplement, or take up the excess, of the generator speed which would be obtained by drive from shaft 32 alone. Driving power for supplying the speed supplement at slow engine speeds is supplied to the air motor 73 by bleed air from the compressor 40a obtained from the bleed 38 via a branch line 7 under the control of a control valve 46, which is the valve according to the present invention. This valve admits the bleed air to the air motor 73 via line 1, the other side 22 of the air motor is vented to an atmospheric connection 23. A change-over valve 30 is interposed between the said other side and the atmospheric connection to permit, by reversal of the valve 30, the side 22 of the motor to be isolated from the atmospheric connection and to be placed into communication with a pressure reservoir 44. At high engine speeds, at which the air motor 73 is required to take up the excess speed, the control valve 46 is arranged to cut off the supply of bleed air from line 7 to the air-motor connection 1 and to connect the air-motor connection 1 to an exhaust 9, while operating to regulate the flow resistance in accordance with the amount of the excess speed to be taken up by the air motor, which in these circumstances sucks in air from atmospheric connection 23, 22 and exhausts it via exhaust connection 1, 9. At even higher speeds, at which the flow resistance even with the valve 46 fully open would be too high to allow the air motor to be driven by the differential gear drive 45 at sufficient speed to take up all the excess speed, this flow resistance is preferably reduced by causing the valve 46 to admit bleed air from line 7 to an injector nozzle 18 provided in the exhaust 9.

When the turbine 40 has to be started, the change-over valve 30 is reversed to admit pressure either from the reservoir 44 or, if available, from the common duct 37 via a non-return valve 43, to the air-motor connection 22, and the valve 46 is arranged to assume a position in which line 1, in addition to being connected to the bleed connection 7 leading to bleed 38 of the turbine compressor 40a, is also connected to the exhaust 9. Thus driving fluid will enter the motor 73 through the connection 22 to drive the motor in the reverse direction and escape from connection 1, partly through exhaust 9 and partly through the engine-compressor bleed line 7, which during standstill of the engine constitutes another atmospheric outlet. A sprag device 33 prevents the alternator from being driven in the reverse direction, with the result that the differential gear drive 45 transmits all the power output of the motor 73 to the engine shaft 32 and drives the latter in a forward direction, thus starting the engine as is described in more detail in our said co-pending application. In order to permit so-called ground-running of the alternator and other engine auxiliaries, the differential gear drive 45 is equipped with a locking device 47 operable to cause the differential drive to act as a fixed-ratio drive driving both the engine shaft and the alternator in the normal direction when the motor 73 runs in the above-mentioned reverse direction.

The construction of the control valve 46 is illustrated in FIGURES 1 to 5.

FIGURE 1 illustrates the condition in which the air motor is used to drive the engine auxiliaries under so-called ground-running conditions, more particularly for test purposes.

The general arrangement is supposed to be that illustrated and described in said co-pending application, air under pressure being supplied to one of the air-motor connections through the starter valve and passing through the air motor to drive the latter in the "reverse" direction that is to say in the direction opposite to that required for supplementing the engine-derived speed of the alternator, while the differential drive is locked to rotate bodily without relative rotation of its various gears. The air exhausted from the air motor passes into the control valve through a passage 1 leading through a ring of ports 2 in the stationary valve sleeve 3 into an annular chamber 4 of a piston-type slide valve 5. In order to obtain maximum exhaust area and thus minimum resistance to the exhaust flow and maximum air-motor power, air from the annular chamber 4 is allowed to escape through two passages, viz: one passage leading through a set of ports 6, hereinafter referred to as bleed-air ports, to the engine-bleed connection 7, which under these conditions is vented since the engine is stationary and assumed to be decoupled from the drive, and a second passage through valve vent ports 8 to a main exhaust vent 9 to which the ports 8 are connected by an annular exhaust-collector chamber 10. In order to achieve automatic control of the position of slide valve 5 so as to maintain the alternator speed constant, the slide valve 5 is biased towards the left-hand side as seen in FIGURE 1 by a spring 21 and is connected to a control piston 13 in a cylinder the two ends of which communicate through lines 11 and 12 respectively with a hydraulic governor system 10a which comprises a source 20 of constant hydraulic pressure which is connected by a line containing a restriction 26 to a spill-type governor which preferably is, as illustrated, of the type in which a half-ball valve 27b resiliently carried on the circumference of the governor shaft 27 by a preloaded reed-type spring 27c, co-operates with a spill port of an internal passage 27a provided in the governor shaft 27 and in permanent communication, via the restrictor 26, with the constant-pressure source 20. The two lines 11 and 12 connect the two ends of the cylinder containing the piston 13 with the governor respectively upstream and downstream of the restrictor 26. When the normal running speed of the alternator is reached, the half-ball valve 27b will be raised from its seat by centrifugal force, causing a spill flow through the restrictor 26 so as to increase the pressure in hydraulic supply line 11 over that in a second hydraulic supply line 12. This pressure drop causes piston 13 to move in such direction that the edge of land 5a of the slide-valve piston 5 reduces the opening of ports 8, thereby progressively restricting the outlet from the air motor and thus the speed at which the air motor will run under the given load conditions. If the generator speed then drops again below its normal speed, the valve 27b closes again, terminating the flow from source 20 through restrictor 26 and the pressure difference between lines 11 and 12 caused thereby, thus allowing the spring 20 to move the slide valve 5 in piston 13 in the opposite direction, thus increasing again the available cross-section of ports 8.

When the constant-speed and starter unit is to be used for starting the engine, the initial control valve position is again that illustrated in FIGURE 1, the only difference being that the differential drive is unlocked, the sprag clutch provided ensuring that the alternator shaft is prevented from turning oppositely to its normal direction of rotation. At the beginning of the starting operation the engine is likewise stationary, so that the air-motor exhaust can again flow both through ports 8 to the main outlet 9 and through engine bleed-air ports 6 to the engine bleed-air duct 7 and the compressor. As the engine gathers speed, the engine compressor will tend to produce a pressure opposing the flow of exhaust through ports 6, but this pressure will only become significant when the engine-decoupling speed is approached and when therefore less power is required from the air motor; the main vent ports 8 are then adequate for the discharge of the air motor exhaust.

When the starting operation has been completed and the engine has reached idling speed, the air motor is required to rotate in the opposite direction in order to supplement the engine-derived alternator speed to the constant speed at which the alternator is required to be driven.

The requisite change-over of the control valve is effected by means of a change-over piston 14 arranged co-axially with the piston 13 and supported against the outer surface of the latter by a piston rod 15. Hydraulic pressure is supplied to the piston 14 through a line 16 either under manual control or if desired by automatic control means responsive to the speed of the engine. The resultant movement of the piston 14 displaces the valve 13 and slide valve member 5 to the position illustrated in FIGURE 2, in which the connection of the annular chamber 4 to the atmospheric outlet 9 is blanked off by the land 17 of the slide-valve element 5, while compressed air from the bleed of the engine compressor is admitted from passage 7 through ports 6 into annular chamber 4 and from there through passage 1 to the air motor, driving the latter in a direction opposite to that in which it was driven when the slide valve element 5 was in the position of FIGURE 1. As in the case of ground running, an increase in alternator speed causes an excess of pressure in line 11 over that in line 12 and thus a displacement of piston 13 to the right. Such displacement will cause the edge 5a of land 17 to reduce the free area of ports 2 and thus the quantity of bleed air admitted to the air motor.

FIGURE 3 illustrates the ultimate state of this control, in which the land 17 completely closes the ports 2, thus substantially locking the air motor against rotation in either direction, so that the alternator is driven exclusively from the engine, the gear ratio being so chosen that when the engine runs at cruising speed, the engine-derived speed of the alternator is the normal alternator speed. Minor variations of the engine speed lead to small displacements of the piston 13 and slide valve element 5, allowing a small amount of engine-bleed air to move past edge 5a of land 17 when the engine-derived speed of the alternator tends to become too low, or allowing the air motor to be driven by the reaction forces of the differential gear in the opposite direction and thus to operate as a pump when the engine-derived speed of the alternator tends to increase above the normal and valve 5 accordingly moves to the right, so that edge 5b of the land 17 allows air expelled by the air motor working as a pump to escape past edge 5b and through ports 8 to the atmospheric vent 9. In order to achieve a fine degree of control, the ends of port 2 adjacent to the ports 6 and 8 respectively, are tapered out so that a relatively large axial piston movement results in a relatively small variation of the available vent or inlet area. The length of the land 17 may be chosen slightly less than the distance between the extreme ends of the ports 2, so that when the slide-valve element 5 is in its central position, a small amount of bleed air will move into passage 1 past edge 5a, and a similar small amount of air will escape from passage 1 past edge 5b of land 17; this further increases the sensitivity of the control.

When the engine operates at a speed appreciably higher than cruising speed, the piston 13, which, as illustrated, has moved clear of the piston rod 15 of piston 14, moves further to the right (as seen in the drawing) to the position illustrated in FIGURE 4, in which a substantial part of ports 2 is open to allow air pumped by the air motor to escape through ports 2 and 8 to the vent 9. Access of bleed air from passage 7 through ports 6 and annular chamber 4 being in these circumstances completely cut off by the land 17.

In order to increase the maximum speed at which the constant speed of the generator can be maintained by use of the air motor, the atmospheric port 9 is equipped with an ejector tube 18 connected to a port 19 in the ported sleeve 3 in which the slide valve element 5 moves. While in the position shown in FIGURE 4 this port 19 is separated from the bleed-air pressure acting in annular chamber 4 by a second land 20 of the slide-valve member, this land moves over the port 19 and progressively opens the latter when speeds higher than those dealt with by the position illustrated in FIGURE 4 are reached. This flow condition is illustrated in FIGURE 5. At these very high engine speeds bleed air from chamber 4 will pass through ports 19 to the ejector tube 18 and thus by producing a suction effect in the vent 9, reduce the pressure against which air escapes from the air motor through passage 1 and increase further the speed of the air motor acting as a pump.

A spring 21 (FIGURE 1) is provided which tends to restore the pistons 13 and 14 to the position illustrated in FIGURE 1. When the whole system is shut down by means of suitable controls, the pressure in the hydraulic line slowly falls to zero, allowing the spring 20 to return pistons 13 and 14 to resume the position illustrated in FIGURE 1 in which the slide valve is ready for the next starting operation.

What we claim is:

1. A composite drive comprising a reversible-flow displacement-type fluid-pressure motor, a shaft required normally to be driven at constant speed, a variable-speed gas turbine, a turbo-compressor for the combustion air driven by the turbine and having an air bleed for said compressor, a differential drive differentially coupling said motor, said shaft, and said turbine, the one side of said motor being connected to a change-over valve device having one position establishing connection to a vent and another position establishing connection to a fluid-pressure source, and a control valve connected to the other side of the fluid-pressure motor, said control valve including a slide valve cylinder having a first port connected to said other side of the motor, an exhaust port, and a third port connected to the compressor bleed of the turbine, said ports being spaced from each other along the cylinder, and a piston-type slide-valve element movable along the cylinder to control communication between said ports, the construction of said slide-valve element being such in relation to the ports that in a first position the slide valve establishes communication between the first and third ports and isolates the exhaust port, progressive movement in one direction from said first position causing first progressive restriction of said communication followed by progressive establishment of communication between the first port and the exhaust port, and progressive movement of the slide valve element in the opposite direction from said first position first establishing communication between said first port and said exhaust port and then restricting communication between the first and third ports.

2. A complete drive comprising a reversible-flow displacement-type fluid-pressure motor, a shaft required normally to be driven at constant speed, a variable-speed gas turbine having a turbo-compressor for the combustion air and an air bleed for said compressor, a differential drive operatively interconnecting said motor, said shaft, and said turbine, a change-over valve device connected to one side of said motor and having one position establishing connection to a vent and another position establishing connection to a fluid-pressure source, and a control valve for connection to the other side of said motor, the control valve including a slide valve cylinder having a first port connected to said other side of the motor, an exhaust port, and a third port connected to the compressor bleed of the turbine, said ports being spaced from each other along the cylinder, and a piston-type slide-valve element movable along the cylinder to control communication between said ports, the construction of said slide-valve element being such in relation to the ports that in a first position the slide valve establishes communication between the first and third ports and isolates the exhaust port, progressive movement in one direction from said first position causing first progressive restriction of said communication followed by progressive establishment of communication between the first port and the exhaust port, and movement of the slide valve element in the opposite direction from said first position establishing communication between said first port and said exhaust port.

3. A composite drive as claimed in claim 2, wherein the control valve includes an exhaust duct connected to the exhaust port, and an ejector nozzle in the exhaust duct, the slide valve cylinder having an additional port so arranged as to communicate with the second port at the end of the slide-valve movement in said one direction.

4. A composite drive as claimed in claim 2 further comprising a speed responsive device controlling a flow of hydraulic liquid to produce a pressure drop in accordance with the speed error of the output shaft wherein the valve also includes a cylinder-and-piston device subject to a pressure difference produced by said flow and operatively connected to the slide-valve element in such manner that a flow corresponding to a positive speed error produces movement of the slide-valve element in said one direction.

5. A composite drive as claimed in claim 4, further comprising a second cylinder and piston device operable to engage the slide valve element, if the latter is in a position displaced from said first position in a direction opposite to said one direction for movement of the slide valve in said one direction up to said first position, while leaving the slide valve element free to move away from the said second device in said one direction.

6. A composite drive as claimed in claim 2, wherein said second port is displaced from the first port in said one direction, the exhaust port being displaced from the first port in the opposite direction, the slide valve element having two lands axially spaced by a distance sufficient to permit, in one position of the element, substantially free communication between the three ports, and the length of the land nearest the exhaust port being sufficient to close the exhaust port.

7. A composite drive as claimed in claim 6, further comprising a speed-responsive device controlling a flow of hydraulic liquid to produce a pressure drop in accordance with the speed error of the output shaft, wherein the valve also includes a cylinder-and-piston device subject to said pressure drop, said cylinder-and-piston device being operatively connected to the slide-valve element in such manner that a flow corresponding to a positive speed error produces movement of the slide valve element in said one direction.

8. A composite drive as claimed in claim 7, wherein the control valve further includes a second cylinder and piston device operable to engage the slide valve element, if the latter is in a position displaced from said first position in a direction opposite to said one position for movement of the slide valve in said one direction up to said first position, while leaving the slide valve element free to move away from the said second device in said one direction.

References Cited in the file of this patent
UNITED STATES PATENTS
2,959,918    West _____ Nov. 15, 1960